(12) United States Patent
Ronning et al.

(10) Patent No.: US 11,632,005 B2
(45) Date of Patent: *Apr. 18, 2023

(54) ELECTRIC MOTOR HAVING STATOR WITH LAMINATIONS CONFIGURED TO FORM DISTINCT COOLING CHANNELS

(71) Applicant: AMERICAN AXLE & MANUFACTURING, INC., Detroit, MI (US)

(72) Inventors: Jeffrey J. Ronning, Grosse Pointe Farms, MI (US); John C. Morgante, Sterling Heights, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 287 days.

This patent is subject to a terminal disclaimer.

(21) Appl. No.: 17/128,288

(22) Filed: Dec. 21, 2020

(65) Prior Publication Data

US 2021/0184518 A1 Jun. 17, 2021

Related U.S. Application Data

(63) Continuation of application No. 16/151,719, filed on Oct. 4, 2018, now Pat. No. 10,923,972.

(60) Provisional application No. 62/593,419, filed on Dec. 1, 2017.

(51) Int. Cl.
*H02K 1/20* (2006.01)
(52) U.S. Cl.
CPC ..................................... *H02K 1/20* (2013.01)
(58) Field of Classification Search
CPC ............ H02K 1/20; H02K 5/20; H02K 5/203; H02K 9/19

USPC ........................... 310/54, 57, 64, 58, 65, 59
See application file for complete search history.

(56) References Cited

U.S. PATENT DOCUMENTS

| | | | |
|---|---|---|---|
| 2,792,511 A | 5/1957 | Horstman | |
| 6,634,081 B2 | 10/2003 | Kohler et al. | |
| 7,847,466 B2 | 12/2010 | Nagai et al. | |
| 9,419,479 B2 | 8/2016 | Shoykhet et al. | |
| 10,432,050 B2 | 10/2019 | Kumagai | |
| 10,923,972 B2 * | 2/2021 | Ronning | H02K 1/20 |

(Continued)

FOREIGN PATENT DOCUMENTS

| | | |
|---|---|---|
| CN | 104737417 A | 6/2015 |
| DE | 3408563 A1 | 9/1985 |

(Continued)

OTHER PUBLICATIONS

First Office Action & translation thereof issued by CIPO in related Chinese Application No. 2018113179499.

*Primary Examiner* — Forrest M Phillips
(74) *Attorney, Agent, or Firm* — Reising Ethington, P.C.

(57) ABSTRACT

An electric motor with a stator that is formed of a plurality of distinct laminations. Each of the distinct laminations has a radially inner lamination edge, which borders a rotor aperture configured to receive a rotor therein, a radially outer lamination edge and a plurality of cooling apertures formed there through that are disposed radially between the radially inner and outer lamination edges. Each cooling aperture in a lamination forms part of a separate and distinct cooling channel that extends helically through the laminations about a rotational axis of the electric motor.

24 Claims, 6 Drawing Sheets

(56) References Cited

U.S. PATENT DOCUMENTS

| | | |
|---|---|---|
| 2013/0270939 A1* | 10/2013 | Brandl .................... H02K 9/19 |
| | | 310/54 |
| 2013/0312251 A1 | 11/2013 | Bender |
| 2015/0207366 A1 | 7/2015 | Burkhardt |
| 2015/0280525 A1 | 10/2015 | Rippel et al. |
| 2016/0025421 A1* | 1/2016 | Rippel .................... F28F 3/086 |
| | | 165/177 |
| 2016/0261169 A1 | 9/2016 | Rawlinson |
| 2017/0163125 A1* | 6/2017 | Granat .................... H02K 9/18 |
| 2018/0054095 A1 | 2/2018 | Dlala et al. |
| 2019/0305615 A1* | 10/2019 | Yamada ................ H02K 5/203 |
| 2020/0153292 A1* | 5/2020 | Yokota .................. H02K 1/185 |
| 2020/0389067 A1* | 12/2020 | Lang ....................... H02K 7/09 |
| 2020/0403464 A1* | 12/2020 | Krais ....................... B60K 1/00 |

FOREIGN PATENT DOCUMENTS

| | | |
|---|---|---|
| DE | 102015215762 A1 | 2/2017 |
| EP | 2658089 A2 | 10/2013 |

* cited by examiner

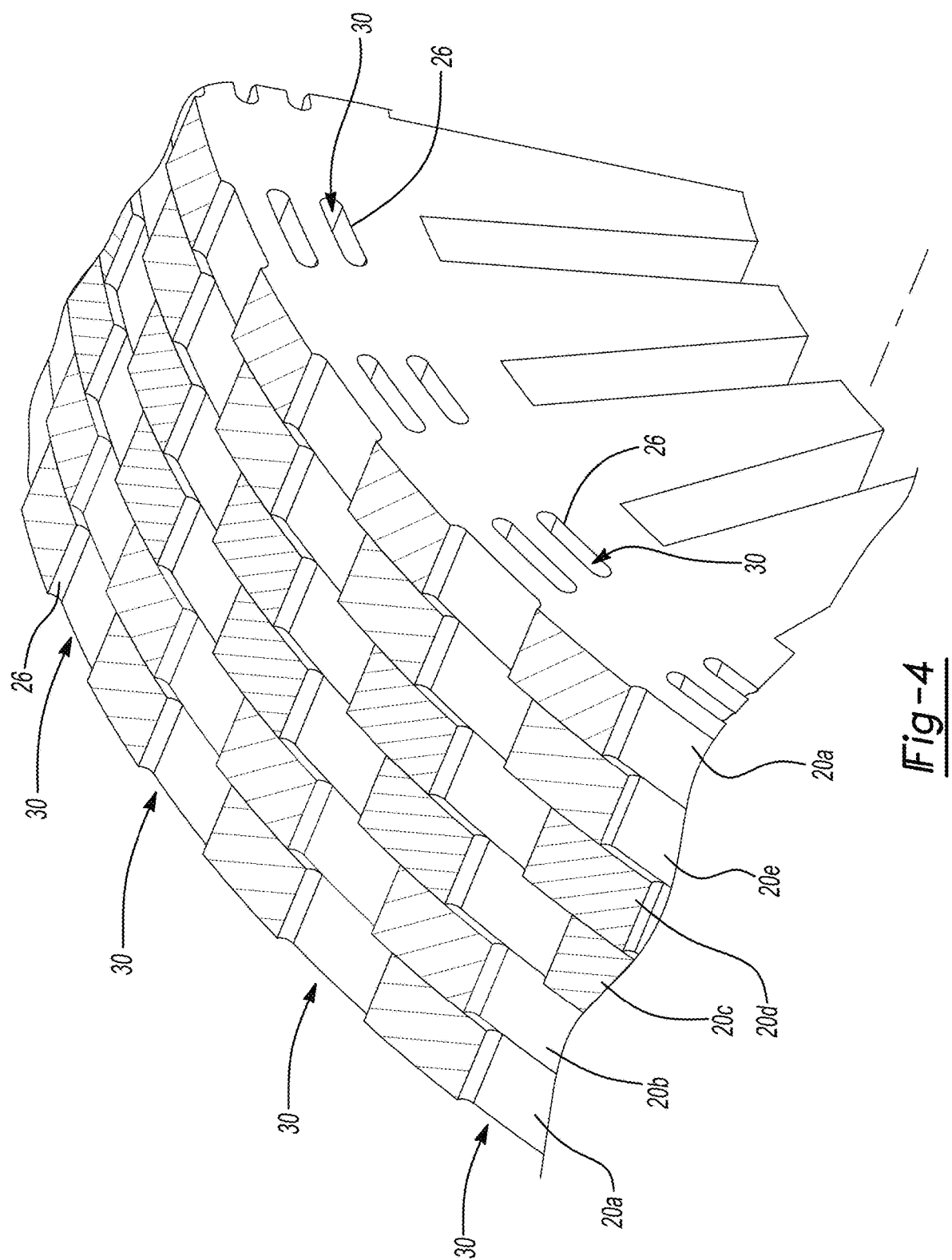

ELECTRIC MOTOR HAVING STATOR WITH LAMINATIONS CONFIGURED TO FORM DISTINCT COOLING CHANNELS

CROSS-REFERENCE TO RELATED APPLICATIONS

This application is a continuation of U.S. application Ser. No. 16/151,719 filed Oct. 4, 2018, which claims the benefit of U.S. Provisional Patent Application No. 62/593,419 filed Dec. 1, 2017. The disclosure of each of the above-referenced applications is incorporated by reference as if fully set forth in detail herein.

FIELD

The present disclosure relates to an electric motor having a stator with laminations that are configured to form distinct cooling channels.

BACKGROUND

This section provides background information related to the present disclosure which is not necessarily prior art.

Electric motors are increasingly employed in applications such as vehicle propulsion where performance requirements as well as limitations on the size, mass and cost of the electric motor require that the electric motor be actively cooled during its operation. More effective cooling of an electric motor is desirable to further improve performance of the electric motor and/or to reduce the size, mass and/or cost of the electric motor.

SUMMARY

This section provides a general summary of the disclosure, and is not a comprehensive disclosure of its full scope or all of its features.

In one form, the present disclosure provides an electric motor that includes a stator, which is formed of a plurality of laminations, and a rotor. The rotor is received in the stator and rotatable relative to the stator about a motor axis. Each of the laminations has a radially inner lamination edge, which borders a rotor aperture into which the rotor is received, and a radially outer lamination edge. Each of the laminations has a plurality of cooling apertures formed there through. The cooling apertures formed in a given one of the laminations are disposed radially between the radially outer lamination edge and the radially inner lamination edge. Each of the laminations is sealingly coupled to at least one other lamination. Each cooling aperture in a lamination forms part of a distinct cooling channel that extends along an axial length of the stator. At least a portion of the cooling apertures in each of the cooling channels are staggered circumferentially about the motor axis.

In another form, the present disclosure provides an electric motor that includes a stator, which is formed of a plurality of laminations, and a rotor that is received in the stator and which is rotatable relative to the stator about a motor axis. Each of the laminations has a radially inner lamination edge, which borders a rotor aperture into which the rotor is received, a radially outer lamination edge. A plurality of cooling apertures formed through each of the laminations. The cooling apertures are formed radially between the radially outer lamination edge and the radially inner lamination edge. Each of the laminations being sealingly coupled to at least one other lamination. A plurality of separate cooling channels are formed in the stator, with each of the separate cooling channels extending helically about the motor axis along an axial length of the stator. Each cooling aperture in a lamination forms part of an associated one of the separate cooling channels. Each of the separate cooling channels is adapted to convey a flow of a cooling fluid helically about the motor axis through the plurality of laminations without merging the flows of the cooling fluid from two or more of the separate cooling channels within the plurality of laminations.

In yet another form, the present disclosure provides an electric motor that includes a stator, which has a lamination stack, and a rotor that is received in the stator and which is rotatable relative to the stator about a motor axis. The lamination stack includes a plurality of distinct laminations. Each of the distinct laminations has a radially inner lamination edge, which borders a rotor aperture into which the rotor is received, and a radially outer lamination edge. Each of the distinct laminations has a plurality of winding slots and a plurality of cooling apertures. The winding slots intersect the rotor aperture and are disposed in a winding slot pattern. The cooling apertures are disposed in a cooling aperture pattern. The cooling aperture pattern of each of the distinct laminations is rotationally offset from the winding slot pattern by a distinct pattern offset. A magnitude of the distinct pattern offset for each of the distinct laminations is different from the distinct pattern offset for each of the other distinct laminations.

In still another form, the present disclosure provides an electric motor that includes a stator, which has a lamination stack, and a rotor that is received in the stator and which is rotatable relative to the stator about a motor axis. The lamination stack includes a plurality of first laminations and a plurality of second laminations. Each of the first and second laminations has a radially inner lamination edge, which borders a rotor aperture into which the rotor is received, and a radially outer lamination edge. Each of the first laminations has a plurality of first winding slots and a plurality of first cooling apertures. The first winding slots are disposed in a winding slot pattern that defines a winding slot pattern datum. The first cooling apertures are formed radially between the radially outer lamination edge and the radially inner lamination edge of the first lamination and are arranged in a cooling aperture pattern that is oriented to the winding slot pattern datum in a first manner. Each of the second laminations has a plurality of second winding slots and a plurality of second cooling apertures. The second winding slots are formed radially between the radially outer lamination edge and the radially inner lamination edge of the second lamination and are disposed in the winding slot pattern. The second cooling apertures are arranged in the cooling aperture pattern but are oriented to the winding slot pattern datum of the second winding slots in a second manner that is rotated about the motor axis relative to the first manner.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a perspective, partly sectioned view depicting the presence of cooling channels formed by the laminations that make up the stator of the electric motor of FIG. 1;

Corresponding reference numerals indicate corresponding parts throughout the several views of the drawings.

DETAILED DESCRIPTION

Example embodiments will now be described more fully with reference to the accompanying drawings.

Figure 1:
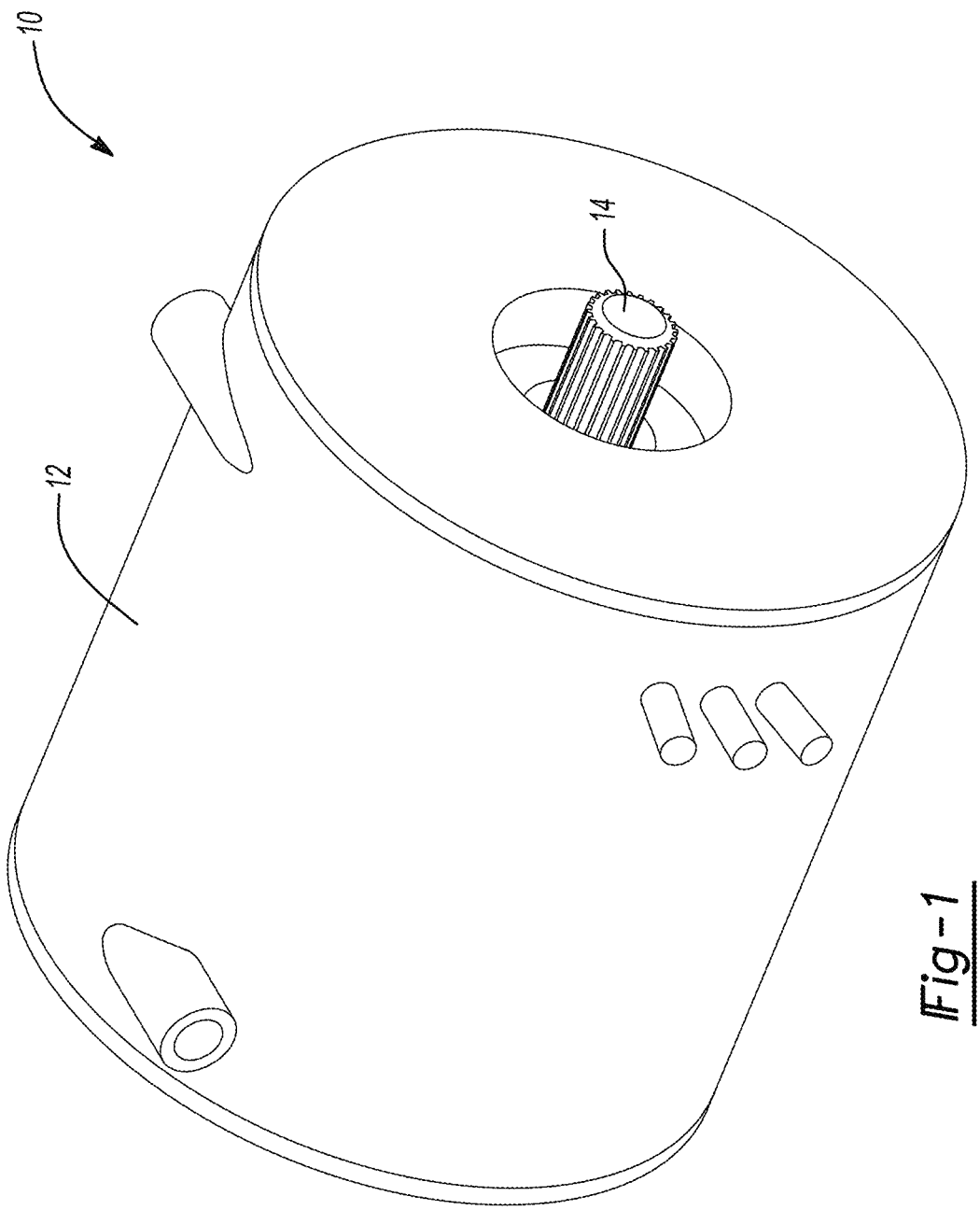
FIG. 1 is a perspective view of an exemplary electric motor constructed in accordance with the teachings of the present disclosure.
Figure 2:
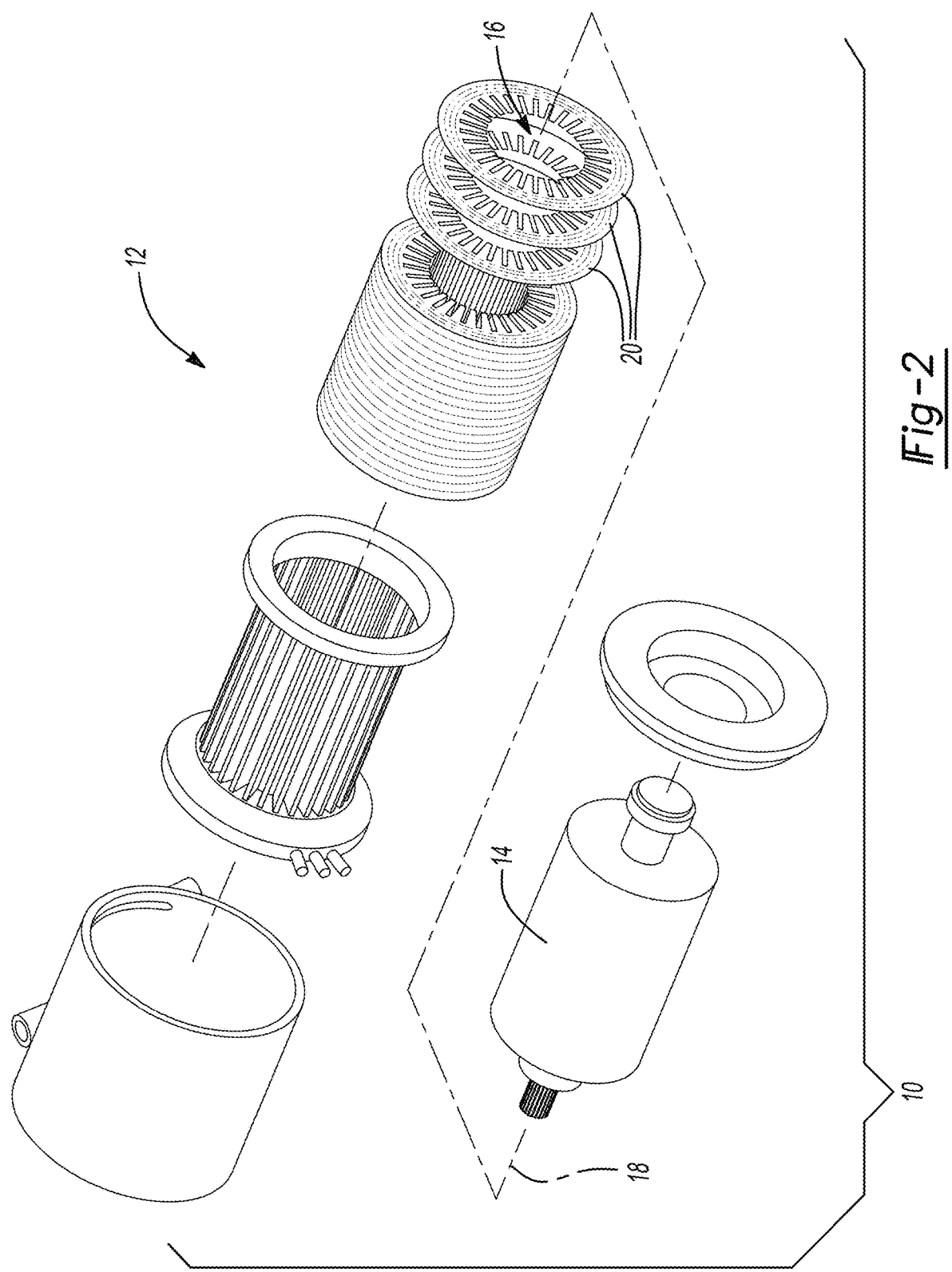
FIG. 2 is an exploded perspective view of the electric motor of FIG. 1.

With reference to FIGS. 1 and 2, an exemplary electric motor constructed in accordance with the teachings of the present disclosure is generally indicated by reference numeral 10. The electric motor 10 includes a stator 12 and a rotor 14 and can be any type of electric motor, such as a brushless DC electric motor or a type of AC induction motor, such as an asynchronous AC induction motor, for example. The rotor 14 is received in a rotor aperture 16 formed in the stator 12 and is rotatable relative to the stator 12 about a motor axis 18. The stator 12 can be formed of a plurality of laminations 20.

Figure 3:
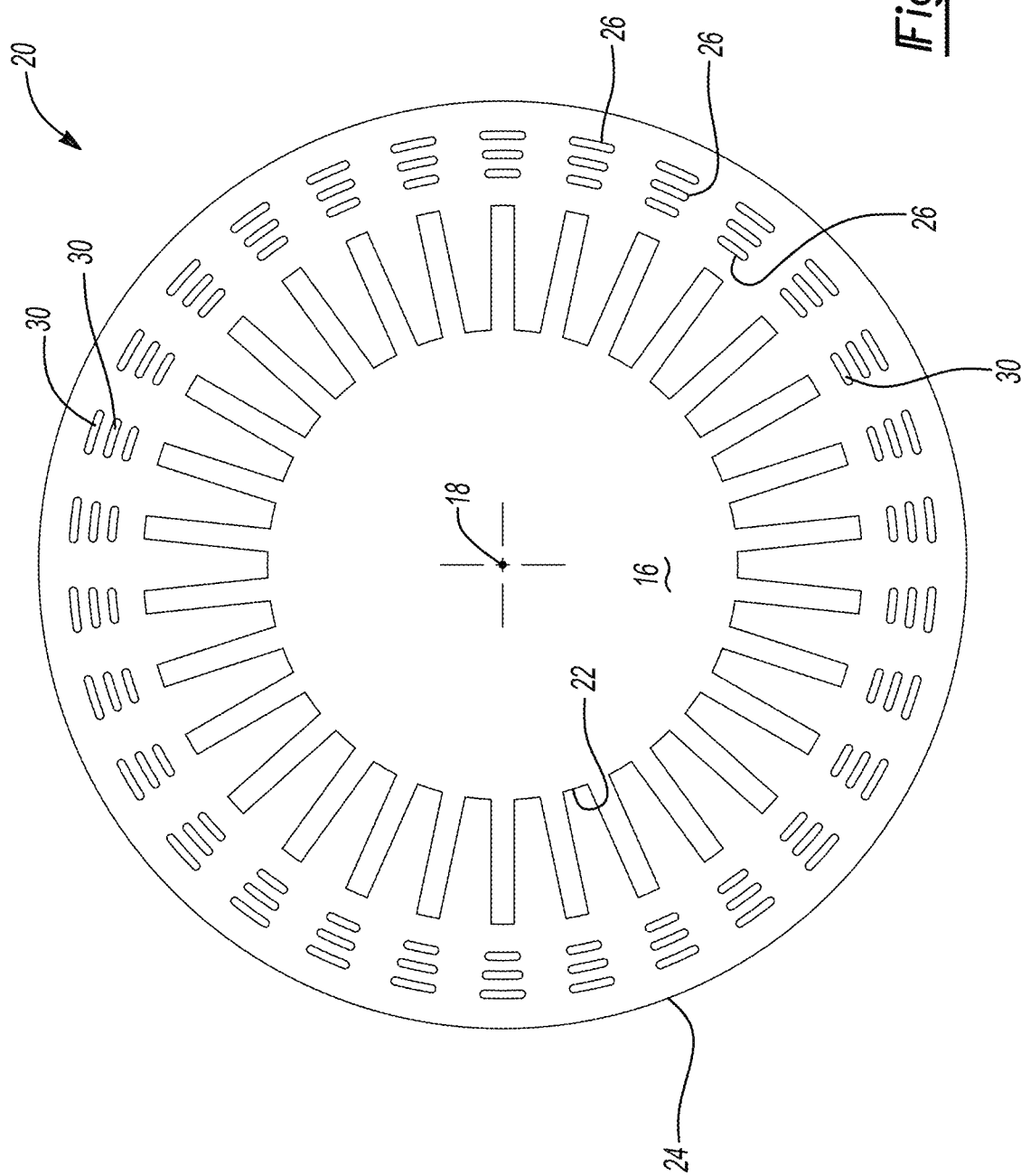
FIG. 3 is an elevation view showing a lamination of a stator of the electric motor of FIG. 1.
Figure 5A:
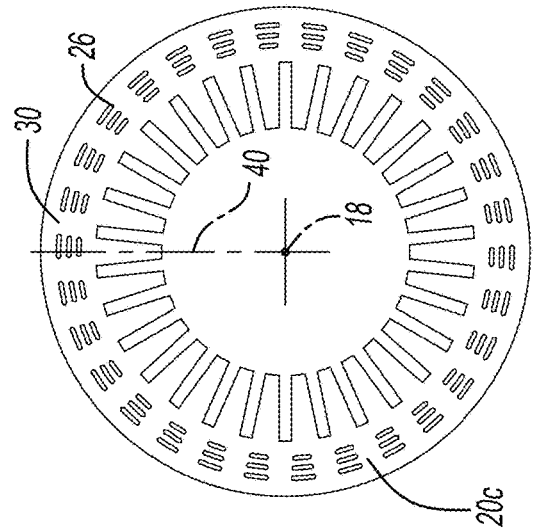
FIGS. 5A through 5E are elevation views depicting five unique laminations that are employed to form the stator of the electric motor of FIG. 1.
Figure 5B:
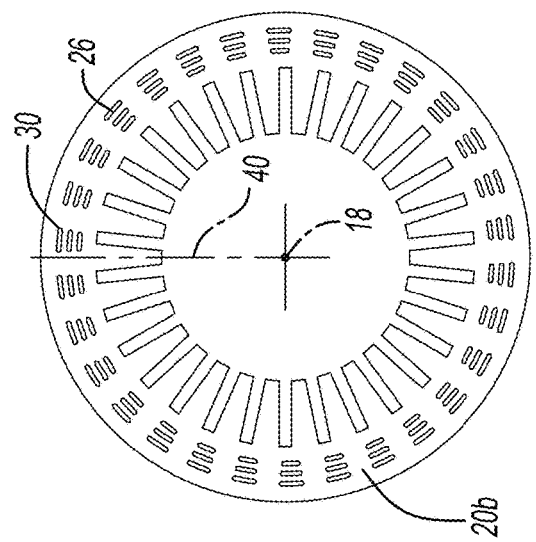
Figure 5C:
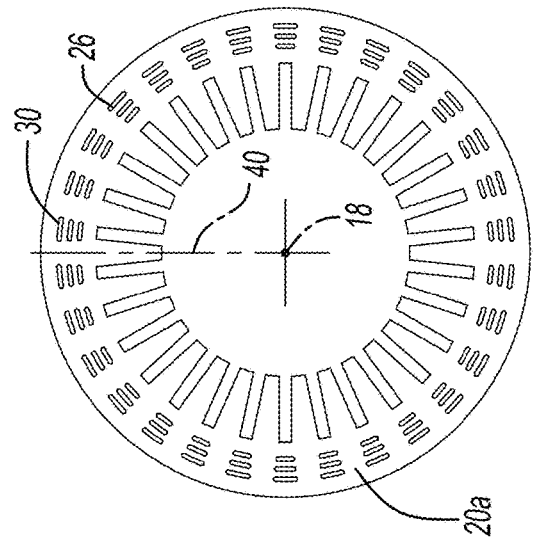
Figure 5E:
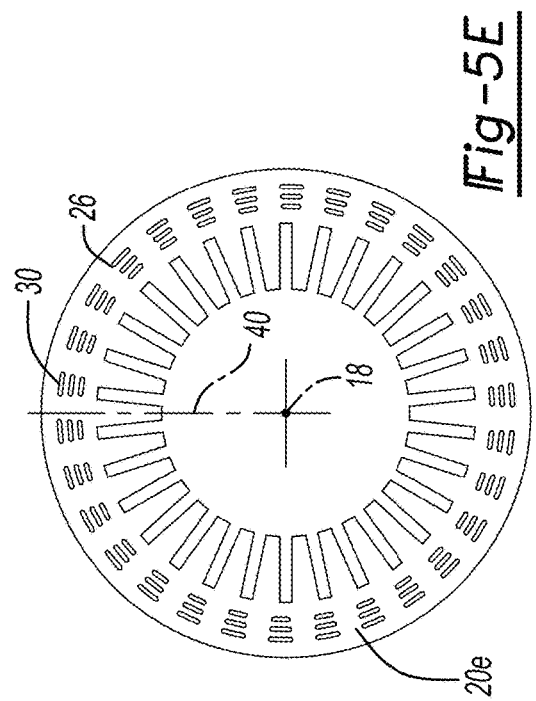
Figure 5D:
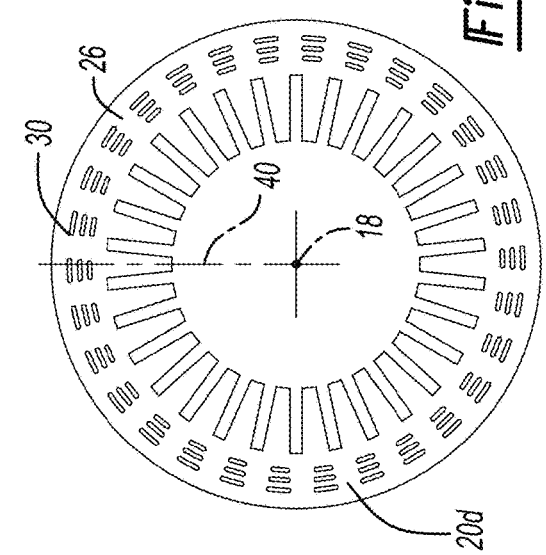

With reference to FIGS. 3 and 4, each of the laminations 20 can have a radially inner lamination edge 22, which forms the border or edge of the rotor aperture 16, and a radially outer lamination edge 24. Each of the laminations 20 has a plurality of cooling apertures 26 formed there through. The cooling apertures 26 can be formed radially between the radially outer lamination edge 24 and the radially inner lamination edge 22. Each cooling aperture in a lamination forms part of a distinct cooling channel 30 that extends along an axial length of the stator 12. The cooling channels 30 are configured to receive a cooling fluid there through during operation of the electric motor 10 to thereby cool the stator 12. At least a portion of the cooling apertures 26 in each of the cooling channels 30 can be staggered circumferentially about the motor axis 18 so that coolant flowing through each of the cooling channels 30 travels circumferentially through at least a portion of the stator 12 as the coolant in the cooling channel 30 passes axially through the stator 12.

With reference to FIGS. 5A through 5E, one means for achieving a circumferential offset in the cooling channels 30 is to employ a plurality of distinct laminations, such as laminations 20a, 20b, 20c, 20d, and 20e. The laminations 20a, 20b, 20c, 20d, and 20e can be identical but for their circumferential positioning of the cooling apertures 26 relative to a common datum 40. It will be appreciated that the cooling apertures 26 in the laminations 20a, 20b, 20c, 20d, and 20e can be circumferentially offset to a degree where the cooling apertures 26 in one of the laminations, such as lamination 20e, partly overlap with the cooling apertures 26 in abutting laminations, such as laminations 20d and 20a, but that the cooling apertures 26 in the abutting laminations (e.g., laminations 20d and 20a) either do not overlap one another or overlap one another to a substantially smaller extent.

While the example shown in FIGS. 4 and 5A-5E employs five discrete laminations 20a, 20b, 20c, 20d, and 20e that are arranged in a repeating sequence in which each lamination is disposed between two differently configured laminations, it will be appreciated that a greater or lesser number of discrete laminations could be employed instead. Moreover, the laminations can be arranged in various other manners. For example, the laminations can be arranged in sequences that are partly made up of identical laminations that are disposed adjacent to one another. For example, the repeating sequence could include five of each of the discrete laminations 20a, 20b, 20c, 20d, and 20e (i.e., a stack of five laminations 20b is abutted on opposite sides against a stack of five laminations 20a and a stack of five laminations 20c, and a stack of five laminations 20d is abutted on opposite sides against a stack of five laminations 20e and the end of the stack of five laminations 20c that is opposite the stack of five laminations 20b) so that a sequence of the laminations consists of 20a, 20a, 20a, 20a, 20a, 20b, 20b, 20b, 20b, 20b, 20c, 20c, 20c, 20c, 20c, 20d, 20d, 20d, 20d, 20d, 20e, 20e, 20e, 20e and 20e. By stacking the discrete/different laminations in a desired manner (e.g., in sequenced stacks), the surface area and path length can be balanced to the desired heat transfer rate(s) and pressure drop(s).

In FIGS. 2 and 4, each of the laminations 20 can be formed of an appropriate material, such as steel. If desired, each of the laminations 20 can be formed to have preferentially oriented magnetic properties in a manner that is well known in the art.

Each of the laminations 20 can be sealingly coupled to at least one other lamination 20. For example, the laminations 20 can be adhesively bonded to one another. The adhesive that secures the laminations 20 to one another can seep between adjacent laminations 20 onto the edges of the cooling apertures 26 by an amount that coats the edges but does not close any of the cooling apertures 26. Configuration in this manner can provide additional strength to the bond between adjacent laminations 20, and/or provide a non-reactive barrier between the material of the laminations 20 (i.e., steel in the example provided) and the coolant that is intended to flow through the coolant channels 30.

Figure 6:
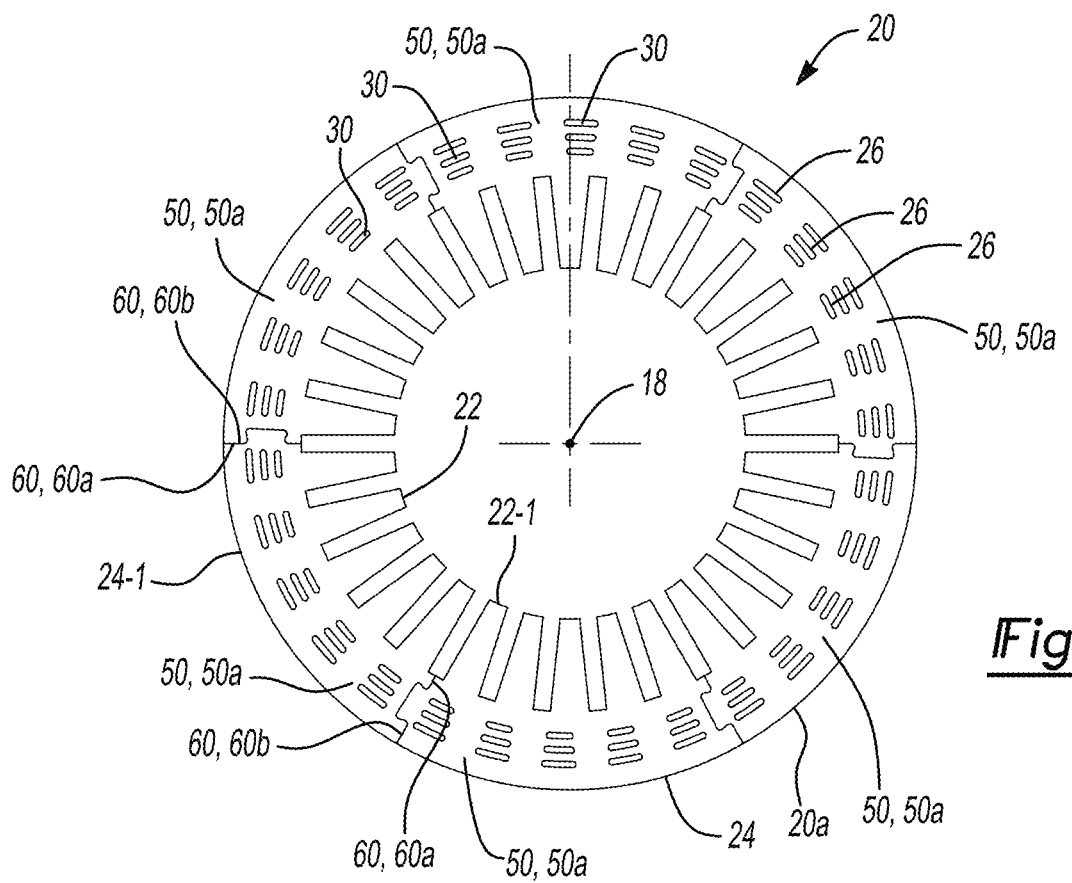
FIGS. 6 and 7 are elevation views of two unique laminations that are formed of unique lamination segments.
Figure 7:
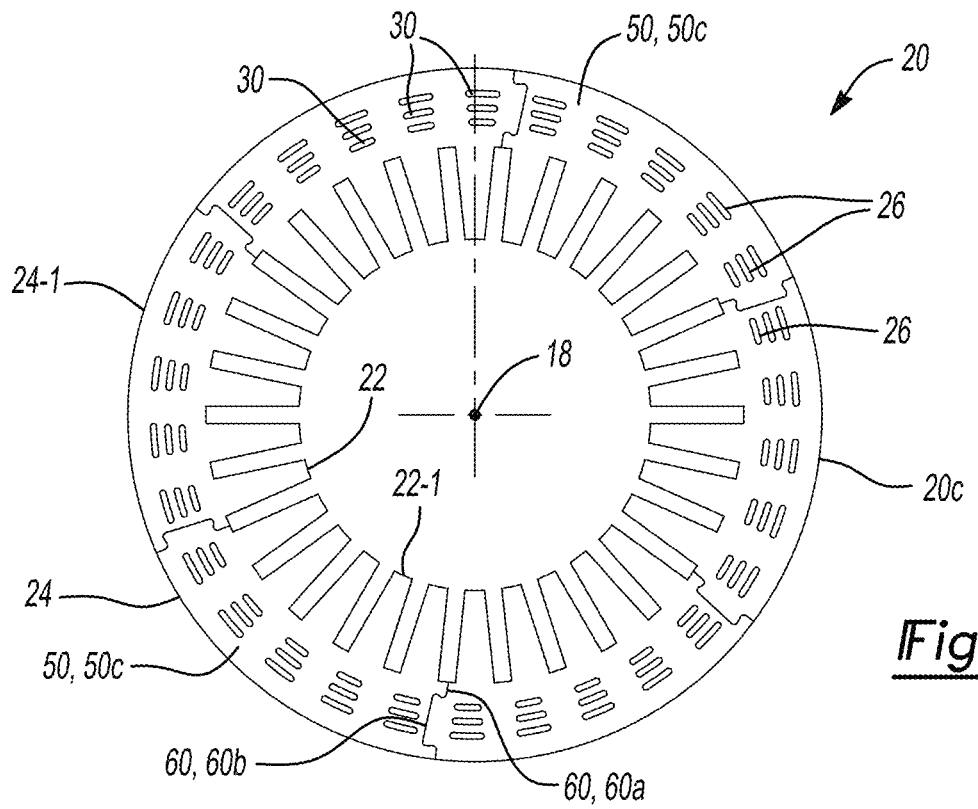

With reference to FIGS. 6 and 7, each lamination could be formed from a plurality of lamination segments 50. In the particular example provided, each of the distinct laminations (e.g., lamination 20a in FIG. 6 or lamination 20c in FIG. 7) is formed from a plurality of identical lamination segments (e.g., lamination segments 50a in FIG. 6 or lamination segments 50c in FIG. 7) that are unique to the distinct lamination (i.e., lamination segments 50a are employed only in the formation of lamination 20a, while lamination segments 50c are employed only in the formation of lamination 20c). Each of the lamination segments 50 can have a radially inner segment edge 22-1, which forms a portion of the radially inner lamination edge 22 of an associated one of the laminations 20, a radially outer segment edge 24-1, which forms a portion of the radially outer lamination edge 24 of the associated one of the laminations 20, and a pair of circumferential segment edges 60 that are each configured to abut a corresponding circumferential segment edge 60 of an associated adjacent lamination segment 50. A portion of the cooling apertures 26 in each lamination 20 can be formed in each of the lamination segments 50 that make up the lamination 20.

The circumferential segment edges 60 can be formed in any desired manner/shape, but preferably do not intersect any of the cooling apertures 26. Optionally, the circumferential segment edges 60 of the lamination segments 60 in a given lamination 20 can be configured to interlock a circumferential segment edge 60 of an adjacent lamination segment 50 within the given lamination 20. For example, a first one of the circumferential segment edges 60a on a given one of the lamination segments 50 can form a tab, while a second one of the circumferential segment edges 60b on the given one of the lamination segments 50 can form a tab aperture. The tap aperture can be configured to receive therein the tab on the first one of the circumferential segment edges 60a on a circumferentially adjacent lamination segment 50.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric motor comprising:
   a stator formed of a plurality of laminations; and
   a rotor received in the stator and rotatable relative to the stator about a motor axis;
   wherein each of the laminations has a radially inner lamination edge, which borders a rotor aperture into which the rotor is received, and a radially outer lamination edge, each of the laminations having a plurality of cooling apertures formed there through, the cooling apertures being formed radially between the radially outer lamination edge and the radially inner lamination edge, each of the laminations being sealingly coupled to at least one other lamination;
   wherein a plurality of separate cooling channels are formed in the stator, each of the separate cooling channels extending helically about the motor axis along an axial length of the stator;
   wherein each cooling aperture in a lamination forms part of an associated one of the separate cooling channels; and
   wherein each of the separate cooling channels is adapted to convey a flow of a cooling fluid helically about the motor axis through the plurality of laminations without merging the flows of the cooling fluid from two or more of the separate cooling channels within the plurality of laminations.

2. The electric motor of claim 1, wherein each of the laminations comprises a plurality of lamination segments, each of the lamination segments having a radially inner segment edge, which forms a portion of the radially inner lamination edge of an associated one of the laminations, a radially outer segment edge, which forms a portion of the radially outer lamination edge of the associated one of the laminations, and a pair of circumferential segment edges that are each configured to abut a corresponding circumferential segment edge of an associated adjacent lamination segment, wherein a portion of the cooling apertures are formed in each of the lamination segments.

3. The electric motor of claim 2, wherein a first one of the circumferential segment edges on a given one of the lamination segments forms a tab and a second one of the circumferential segment edges on another one of the lamination segments forms a tab aperture that is configured to receive therein the tab on the first one of the circumferential segment edges on a circumferentially adjacent lamination segment.

4. The electric motor of claim 3, wherein neither of the circumferential segment edges of any of the lamination segments intersects any of the cooling apertures.

5. The electric motor of claim 2, wherein at least five distinct and different lamination segments are employed over the axial length of the stator to form each cooling channel.

6. The electric motor of claim 5, wherein the lamination segments that make up a given one of the laminations are identical.

7. The electric motor of claim 2, wherein each of the lamination segments is formed with preferentially oriented magnetic properties.

8. The electric motor of claim 1, wherein each of the laminations is formed with preferentially oriented magnetic properties.

9. The electric motor of claim 1, wherein at least five distinct and different laminations are employed over the axial length of the stator to form each cooling channel.

10. The electric motor of claim 1, wherein at least a portion of the cooling apertures in each of the separate cooling channels are staggered circumferentially about the axis.

11. An electric motor comprising:
    a stator having a lamination stack; and
    a rotor received in the stator and rotatable relative to the stator about a motor axis;
    wherein the lamination stack includes a plurality of distinct laminations;
    wherein each of the distinct laminations has a radially inner lamination edge, which borders a rotor aperture into which the rotor is received, and a radially outer lamination edge; and
    wherein each of the distinct laminations has a plurality of winding slots and a plurality of cooling apertures, the winding slots intersecting the rotor aperture and being disposed in a winding slot pattern, the cooling apertures being disposed in a cooling aperture pattern, wherein the cooling aperture pattern of each of the distinct laminations is rotationally offset from the winding slot pattern by a distinct pattern offset, and wherein a magnitude of the distinct pattern offset for each of the distinct laminations is different from the distinct pattern offset for each of the other distinct laminations.

12. The electric motor of claim 11, wherein the plurality of distinct laminations are arranged in a sequenced stack that is used a plurality of times to form the lamination stack.

13. The electric motor of claim 12, wherein each of the plurality of distinct laminations is employed a plurality of times in each sequenced stack.

14. The electric motor of claim 11, wherein the plurality of distinct laminations in the lamination stack are fixedly and sealingly coupled to one another.

15. The electric motor of claim 11, wherein each of the plurality of distinct laminations comprises a plurality of lamination segments, each of the lamination segments having a radially inner segment edge, which forms a portion of the radially inner lamination edge of an associated one of the plurality of distinct laminations, a radially outer segment edge, which forms a portion of the radially outer lamination edge of the associated one of the plurality of distinct laminations, and a pair of circumferential segment edges that are each configured to abut a corresponding circumferential segment edge of an associated adjacent lamination segment, wherein a portion of the cooling apertures are formed in each of the lamination segments.

16. The electric motor of claim 15, wherein a first one of the circumferential segment edges on a given one of the lamination segments forms a tab and a second one of the circumferential segment edges on another one of the lamination segments forms a tab aperture that is configured to receive therein the tab on the first one of the circumferential segment edges on a circumferentially adjacent lamination segment.

17. The electric motor of claim 16, wherein neither of the circumferential segment edges of any of the lamination segments intersects any of the cooling apertures.

18. The electric motor of claim 15, wherein at least five different lamination segments are employed over the overall length of the lamination stack to form each cooling channel.

19. The electric motor of claim 18, wherein the lamination segments that make up a given one of the plurality of distinct laminations are identical.

20. The electric motor of claim 15, wherein each of the lamination segments is formed with preferentially oriented magnetic properties.

21. The electric motor of claim 11, wherein each of the plurality of distinct laminations is formed with preferentially oriented magnetic properties.

22. An electric motor comprising:
a stator having a lamination stack; and
a rotor received in the stator and rotatable relative to the stator about a motor axis;
wherein the lamination stack includes a plurality of first laminations and a plurality of second laminations;
wherein each of the first and second laminations has a radially inner lamination edge, which borders a rotor aperture into which the rotor is received, and a radially outer lamination edge; and
wherein each of the first laminations having a plurality of first winding slots and a plurality of first cooling apertures, the first winding slots being disposed in a winding slot pattern that defines a winding slot pattern datum, the first cooling apertures being formed radially between the radially outer lamination edge and the radially inner lamination edge of the first lamination and being arranged in a cooling aperture pattern that is oriented to the winding slot pattern datum in a first manner, each of the second laminations having a plurality of second winding slots and a plurality of second cooling apertures, the second winding slots being formed radially between the radially outer lamination edge and the radially inner lamination edge of the second lamination and being disposed in the winding slot pattern, the second cooling apertures being arranged in the cooling aperture pattern but being oriented to the winding slot pattern datum of the second winding slots in a second manner that is rotated about the motor axis relative to the first manner.

23. The electric motor of claim 22, wherein the lamination stack includes a plurality of third laminations; and
wherein each of the third laminations having a plurality of third winding slots and a plurality of third cooling apertures, the third winding slots being formed radially between the radially outer lamination edge and the radially inner lamination edge of the third lamination and being disposed in the winding slot pattern, the third cooling apertures being arranged in the cooling aperture pattern but being oriented to the winding slot pattern datum of the third winding slots in a third manner that is rotated about the motor axis relative to the first manner and relative to the second manner.

24. The electric motor of claim 23, wherein the first cooling apertures, the second cooling apertures, and the third cooling apertures form a cooling channel that extends helically about the motor axis.

* * * * *